United States Patent
Hara

(10) Patent No.: US 9,741,171 B2
(45) Date of Patent: Aug. 22, 2017

(54) IMAGE PROCESSING DEVICE AND IMAGE PROCESSING METHOD

(71) Applicant: FUJITSU LIMITED, Kawasaki-shi, Kanagawa (JP)

(72) Inventor: Nobuyuki Hara, Meguro (JP)

(73) Assignee: FUJITSU LIMITED, Kawasaki (JP)

( * ) Notice: Subject to any disclaimer, the term of this patent is extended or adjusted under 35 U.S.C. 154(b) by 5 days.

(21) Appl. No.: 14/750,738

(22) Filed: Jun. 25, 2015

(65) Prior Publication Data
US 2016/0049009 A1     Feb. 18, 2016

(30) Foreign Application Priority Data
Aug. 15, 2014   (JP) .................. 2014-165506

(51) Int. Cl.
*G06T 19/00*   (2011.01)
*G06K 9/00*   (2006.01)
(Continued)

(52) U.S. Cl.
CPC ........... *G06T 19/006* (2013.01); *G06F 3/012* (2013.01); *G06K 9/00671* (2013.01)

(58) Field of Classification Search
None
See application file for complete search history.

(56) References Cited

U.S. PATENT DOCUMENTS

| | | | |
|---|---|---|---|
| 6,711,293 B1 | 3/2004 | Lowe | |
| 2009/0110291 A1* | 4/2009 | Matsumura | ........... G06T 7/0075 382/195 |

(Continued)

FOREIGN PATENT DOCUMENTS

| | | |
|---|---|---|
| JP | 2001-197400 | 7/2001 |
| JP | 2005-339266 | 12/2005 |

(Continued)

OTHER PUBLICATIONS

Ishii et al. "Proposal and Evaluation of Decommissioning Supporting Method of Nuclear Power Plants using Augmented Reality", Transaction of the Virtual Reality Society of Japan, pp. 289-300, vol. 13 No. 2, 2008.

(Continued)

*Primary Examiner* — Kee M Tung
*Assistant Examiner* — Yanna Wu
(74) *Attorney, Agent, or Firm* — Staas & Halsey LLP

(57) ABSTRACT

An image processing device includes memory; and a processor configured to execute a plurality of instructions stored in the memory, the instructions comprising: recognizing a target object recognized from a first image, which is a captured image, including the target object in a real world; controlling a second image, which is an augmented image, including information of the target object from the first image, and a third image which is an augmented image of the second image and to be formed so as to inscribe an outer surrounding the second image and covers a center of visual field of a user relative to the second image; and displaying, in a state where the user directly visually recognizes the target object in the real world, the second image and the third image such that the second image and the third image are caused to correspond to a position.

19 Claims, 13 Drawing Sheets

(51) Int. Cl.
*G06T 7/20* (2017.01)
*G06F 3/01* (2006.01)

(56) References Cited

U.S. PATENT DOCUMENTS

| | | | | |
|---|---|---|---|---|
| 2011/0234476 | A1* | 9/2011 | Sugihara | G02B 27/0172 345/8 |
| 2013/0069985 | A1* | 3/2013 | Wong | G02B 27/017 345/633 |
| 2013/0148849 | A1* | 6/2013 | Nakai | G06K 9/00664 382/103 |
| 2014/0085203 | A1* | 3/2014 | Kobayashi | G01S 19/14 345/158 |
| 2014/0121015 | A1* | 5/2014 | Massing | G07F 17/3211 463/33 |

FOREIGN PATENT DOCUMENTS

| | | |
|---|---|---|
| JP | 2006-267887 | 10/2006 |
| JP | 2012-173772 | 9/2012 |

OTHER PUBLICATIONS

Kenneth N. Oglet et al. "Depth of Focus of the Human Eye", Journal of the Optical Society of America, vol. 49, No. 3, pp. 273-280, Mar. 1959.

Herbert Bay et al. "Speeded-Up Robust Features (SURF)", Computer Vision and Image Understanding, Vo. 110, No. 3, pp. 346-359, 2008.

\* cited by examiner

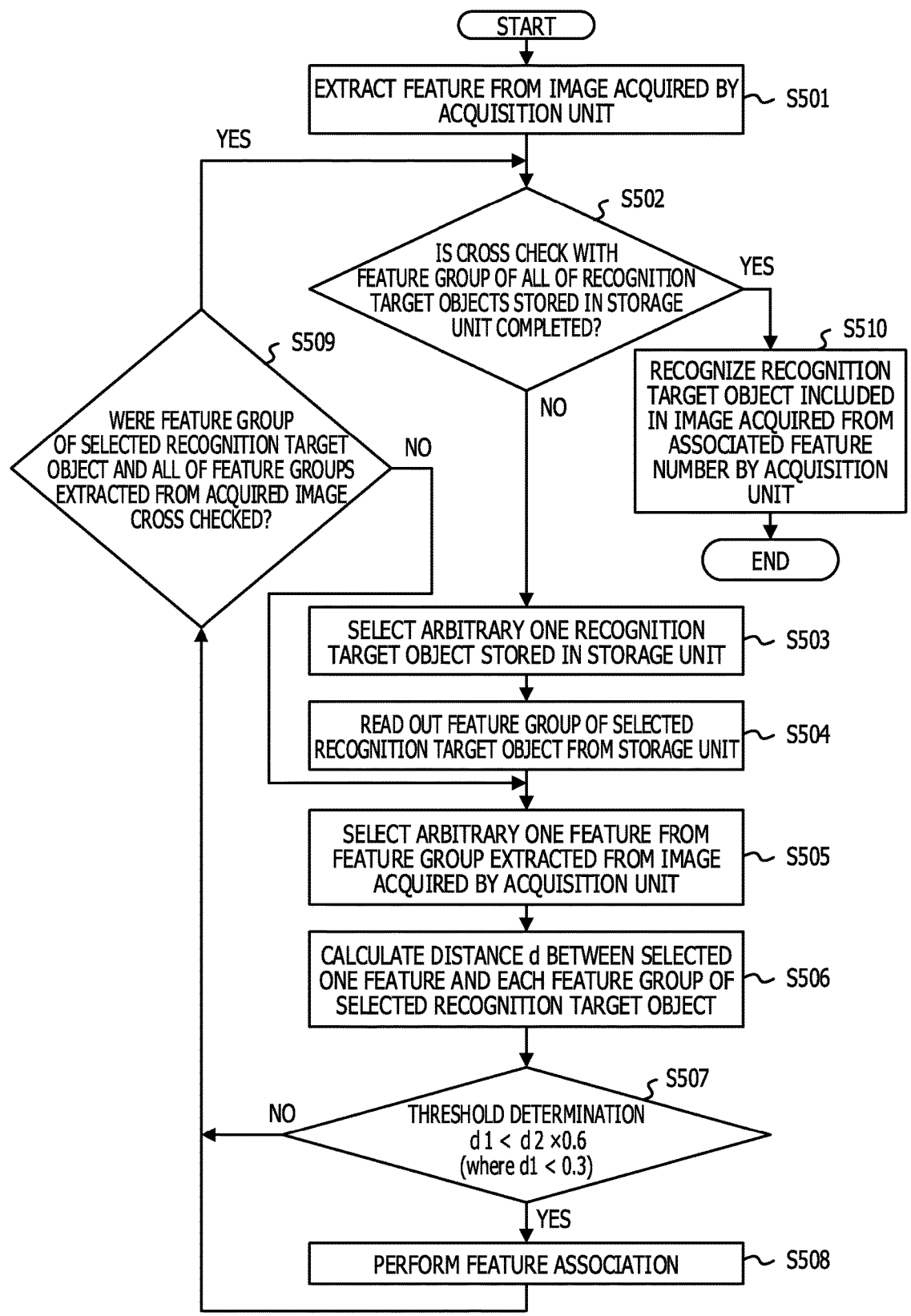

FIG. 7

| FRAME No. (N) | FINGER POSITION | | RECOGNITION TARGET OBJECT POSITION | | FINGER MOVING AMOUNT, MOVING DIRECTION (ANGLE) | | | POSITION DIRECTION OF RECOGNITION TARGET OBJECT (DEGREE) | DIRECTION DIFFERENCE (DEGREE) |
|---|---|---|---|---|---|---|---|---|---|
| | $H_X$ (PIXEL) | $H_Y$ (PIXEL) | $T_X$ (PIXEL) | $T_Y$ (PIXEL) | $H_X$ CHANGE AMOUNT (PIXEL) | $H_Y$ CHANGE AMOUNT (PIXEL) | CHANGE DIRECTION ANGLE (DEGREE) | | |
| 200 | 599 | 443 | 296 | 156 | null | null | null | 223.4 | null |
| 201 | 568 | 417 | 300 | 155 | -35 | -25 | 215.5 | 224.4 | 8.9 |
| 202 | 540 | 393 | 297 | 164 | -25 | -33 | 232.9 | 223.3 | 9.6 |
| 203 | 510 | 365 | 289 | 158 | -22 | -22 | 225.0 | 223.1 | 1.9 |
| 204 | 478 | 337 | 291 | 154 | -34 | -24 | 215.2 | 224.4 | 9.2 |
| 205 | 458 | 310 | 297 | 160 | -26 | -33 | 231.8 | 223.0 | 8.8 |

70

○ :CENTRAL VISUAL FIELD

○ :CENTRAL VISUAL FIELD

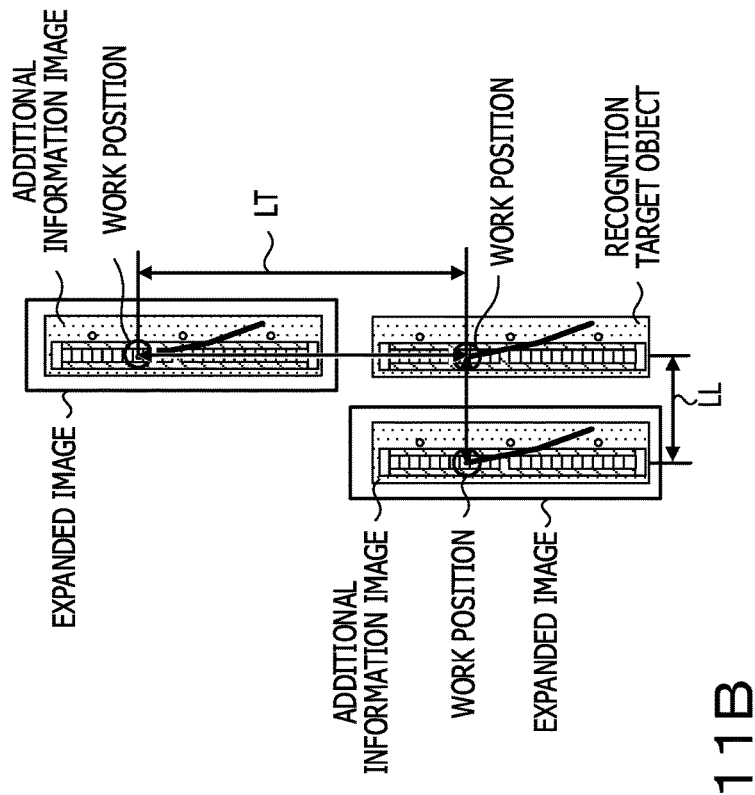
FIG. 11A
FIG. 11C
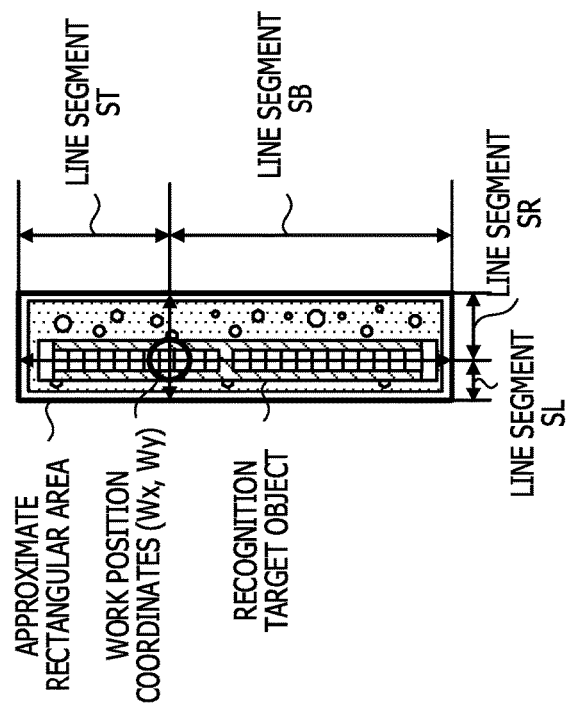
FIG. 11B
| BASIC DISTANCE SOT (PIXEL) TO UPPER SIDE OF APPROXIMATE RECTANGULAR AREA | BASIC DISTANCE SOL (PIXEL) TO LEFT SIDE OF APPROXIMATE RECTANGULAR AREA | BASIC DISTANCE SOB (PIXEL) TO LOWER SIDE OF APPROXIMATE RECTANGULAR AREA | BASIC DISTANCE SOR (PIXEL) TO RIGHT SIDE OF APPROXIMATE RECTANGULAR AREA |
|---|---|---|---|
| 8 | 1.6 | 11 | 2.4 |

IMAGE PROCESSING DEVICE AND IMAGE PROCESSING METHOD

CROSS-REFERENCE TO RELATED APPLICATION

This application is based upon and claims the benefit of priority of the prior Japanese Patent Application No. 2014-165506, filed on Aug. 15, 2014, the entire contents of which are incorporated herein by reference.

FIELD

The embodiments discussed herein are related to, for example, an image processing device, an image processing method, and an image processing program, used for displaying an additional information image that is user work support information corresponding to a recognition target object.

BACKGROUND

In recent years, with the development of information technology, an image processing technique related to augmented reality (AR), in which visual information is added to an image acquired by capturing an image of a reality space (a real world) using a computer, has been under development. In displaying visual information, mainly, a wearable device, such as a head mounted display (HMD) to which a camera that captures an image in the real world is attached, and the like, a tablet terminal provided with a camera, and the like, are used, and detailed information (which will be hereinafter referred to as an additional information image (or may be referred to as a virtual world image)) related to a recognition target object that exists in the visual filed direction of a user is superimposed on an object in the real world and thus displayed.

Currently, a technology for supporting identification of a failure part at the occurrence of a failure of an electronic device or the like, and failure repairing work by a user using an augmented reality technology has been realized. For example, a technique in which, in support for repairing work for repairing a failure of sheet jamming, an internal video image of a copy machine and an image of operation procedures, which are additional information images and have been prepared in advance in association with a sheet jamming occurrence position, are superimposed and thus displayed in the copy machine, which is a recognition target object, has been proposed. For example, in "Proposal and Evaluation of a Supporting Method for NPP Decommissioning Work by Augmented Reality", Transaction of the Virtual Reality Society of Japan, 2008, pp. 289-300, vol. 13 No. 2, work support using augmented reality has been proposed also in a field work of maintenance and inspection, equipment installation and dismantlement, or the like, in an industrial plant.

In user work support, since, in many cases, a user works using the both hands, there are great demands for utilization of a HMD, which is head-wearable and hands-free, rather than a tablet terminal. HMDs are largely divided into two types, that is a video see-through type HMD, which displays an additional information image, in addition to a captured image of a camera, on a display unit, such as a display and the like, and an optical see-through type HMD, which displays an additional information image in association with the position of an object in the real world visually recognized by a user using a half mirror on a display unit. Considering a visual filed limit due to a field angle of a camera and the occurrence of a time lag from image capturing to image displaying, there might be cases where use of the video see-through type HMD in a field work is not appropriate. On the other hand, in the optical see-through type HMD, a user actually visually observes a recognition target object in the real world, and therefore, the optical see-through type HMD has an advantage in which there is not a visual limit due to the field angle and a time lag. For this reason, there have been demands for work support by augmented reality using the optical see-through type HMD.

SUMMARY

In accordance with an aspect of the embodiments, an image processing device includes memory; and a processor configured to execute a plurality of instructions stored in the memory, the instructions comprising: recognizing a target object recognized from a first image, which is a captured image, including the target object in a real world; controlling a second image, which is an augmented image, including information of the target object from the first image, and a third image which is an augmented image of the second image and to be formed so as to inscribe an outer surrounding the second image and covers a center of visual field of a user relative to the second image; and displaying, in a state where the user directly visually recognizes the target object in the real world, the second image and the third image such that the second image and the third image are caused to correspond to a position of the target object in the real world.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 5 is a flow chart of recognition processing of recognizing a recognition target object performed by a recognition unit;

FIG. 7 is an example table including a data structure of a motion vector of an operation site calculated by the calculation unit;

FIG. 11A is a relationship diagram of a work position of a recognition target object and a line segment of each side in an approximate rectangular area;

FIG. 11B is a table illustrating an example data structure of a line segment of each side in the approximate rectangular area;

FIG. 11C is a conceptual diagram of candidate display positions of an additional information image and an expanded image;

DESCRIPTION OF EMBODIMENTS

Figure 1:
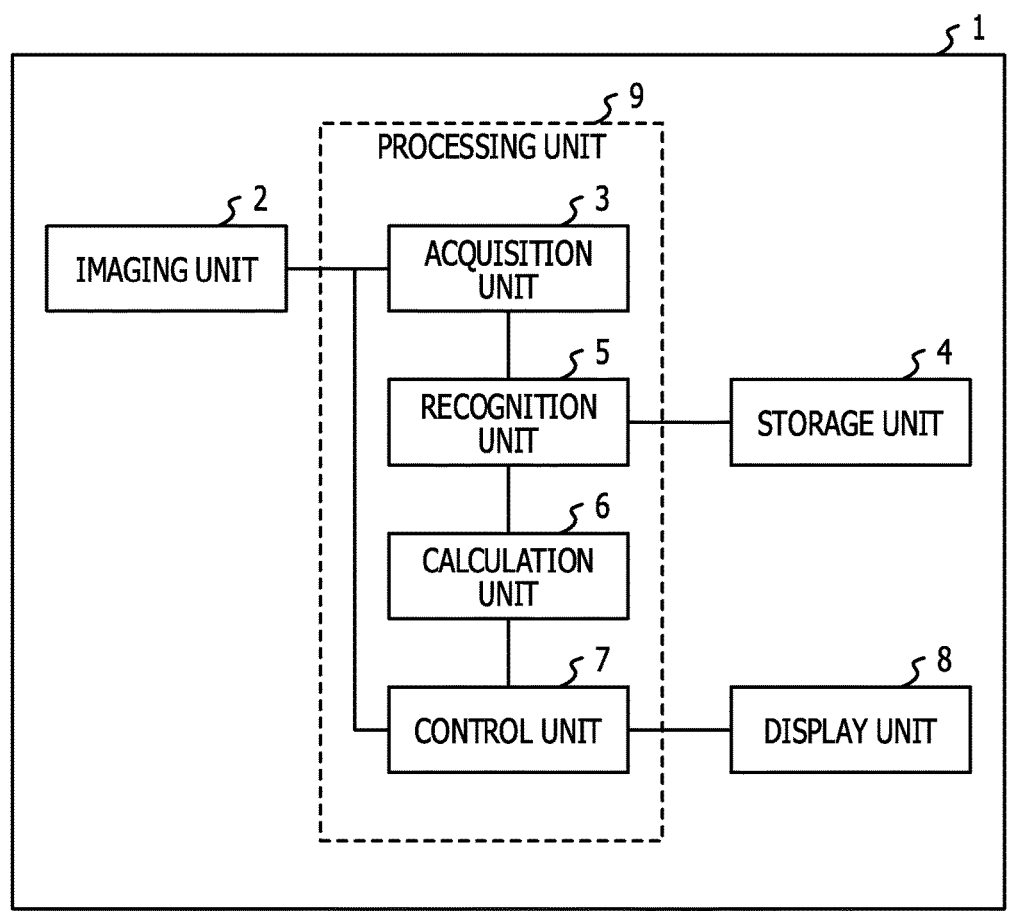
FIG. 1 is a functional block diagram of an image processing device according to an embodiment.

First, a problem in the related art techniques will be described. Note that the problem was newly found by the present inventors as a result of their detailed examinations, and had not been conventionally known. It was newly found by the inspection conducted by the present inventors that, in an image processing device using an optical see-through type HMD, there is the following problem in ensuring visibility of both of a recognition target object in the real world and an additional information image, which is user work support information corresponding to the recognition target object.

In superimposing an additional information image on a recognition target object in the real world and thus displaying an acquired image using the optical see-through type HMD, if the display position of the additional information image (which may be referred to as a depth relative to each of the foveae of user's eyes) is different from a distance to the recognition target object, a focal distance differs between the additional information image and the recognition target in the real world, and the user often adjust the focus distance unconsciously. In this case, great eye strain of the user is caused, and thus, visibility of the recognition target object in the real world and the additional information image reduces.

For example, in superimposing of an additional information image on a recognition target object in the real world and thus displaying an acquired image in the optical see-through type HMD, the distance of the additional information image (which may be referred to as a depth relative to each of the foveae of user's eyes) is fixed to a predetermined distance (which differs depending on the configuration of a display unit, but for example, about 1 m) depending the configuration of the display unit. On the other hand, the distance to the recognition target object, which is a work target object, serially varies in accordance with work contents or the like. Therefore, because of a limitation of the depth of field of the user's eyes, when the user gazes at one of the recognition target object in the real world and the additional information image, the other thereof looks blurred, and both of the recognition target object in the real world and the additional information image are not visually recognize at the same time, and therefore, advantages of superimposed display by augmented reality are not achieved.

The range of depth of field corresponds to a visually recognizable range in which a clear image may be acquired on the retina without changing the reflection index of lenses within the eyes (that correspond to a lens of a camera), and an image of an object outside the depth of field on the retina is blur. As factors that determine the depth of field, there are a pupil diameter and the visible distance of a recognition target object. Although the pupil diameter varies among individuals, in general, the pupil diameter depends on the brightness in a work environment (for example, 1.2 mm indoors (in a dark place) and 8 mm outdoors (in a bright place)) and is about 3-5 mm in an envisioned work environment, and the depth of field is narrowed when the pupil diameter is large (in a bright place), as compared to when the pupil diameter is small (in a dark place). When the relationship between the visible distance of a recognition target object and the depth of field is taken into account, as the visible distance of a recognition target object increases, the depth of field increases and, as the visible distance of a recognition target object reduces, the depth of field reduces.

Now, assuming a work environment in which an optical see-through type HMD is used, the depth of field relative to a recognition target object corresponding to a work target object in the work environment will be discussed. For example, with reference to "Depth of focus of the human eye, Journal of the Optical Society of America, 49, 273-280 (1959)", a focal depth when the pupil diameter is 4.8 mm is defined to be ±0.45 (D) (unit D: diopter). For example, assuming that the distance to the recognition target object is defined to be 0.5 m (=2 D), the depth of field when the focal distance is adjusted to a recognition target object is 0.41-0.65 cm (2±0.45 D). Therefore, for example, when an additional information image is superimposed and thus displayed with a focal distance of 1 m in a state where a work target object is gazed at a distance of 50 cm from the work target object, the focal distance of the additional information image is out of the range of the depth of field at the focal distance (50 cm) of the recognition target object in the real world, and therefore, the additional information image is blurred and the user is not be able to clearly visibly recognize the additional information image.

When an object or an image located out of the range of the depth of field is gazed at, the focal distance is adjusted depending on change of the reflection index of the lenses and, in addition, human eyes unconsciously try to focus on a part at which is gazed. Therefore, when the display position (depth) of the additional information image is out of the range of the depth of field at the visible distance of the recognition target object, adjustment in which the focal distance is changed is performed each time a gazing target is changed to a recognition target object corresponding to the additional information image and the work target object in the real world is a burden on the eyes of the user. Note that, although details will be described later, since this focal distance change is unintentionally repeated by a user, great eye strain is caused.

In view of the above-described newly found problem, the present inventors newly found that it may be enabled to provide an image processing device which allows increase in visibility of a recognition target object in the real world and an additional information image by reducing the number of focus changes that are unintentionally performed by a user.

Considering a newly found technical matter or problem with the above-described diligent inspections conducted by the present inventors, examples of an image processing device, an image processing method, and an image processing program according to an embodiment will be described below in detail with reference to the accompanying drawings. Note that the examples below are not intended to limit the disclosed technique herein.

First Embodiment

FIG. 1 is a functional block diagram of an image processing device 1 according to an embodiment. The image processing device 1 includes an imaging unit 2, a storage unit 4, a display unit 8, and a processing unit 9. The processing unit 9 includes an acquisition unit 3, a recognition unit 5, a calculation unit 6, and a control unit 7.

Figure 2:
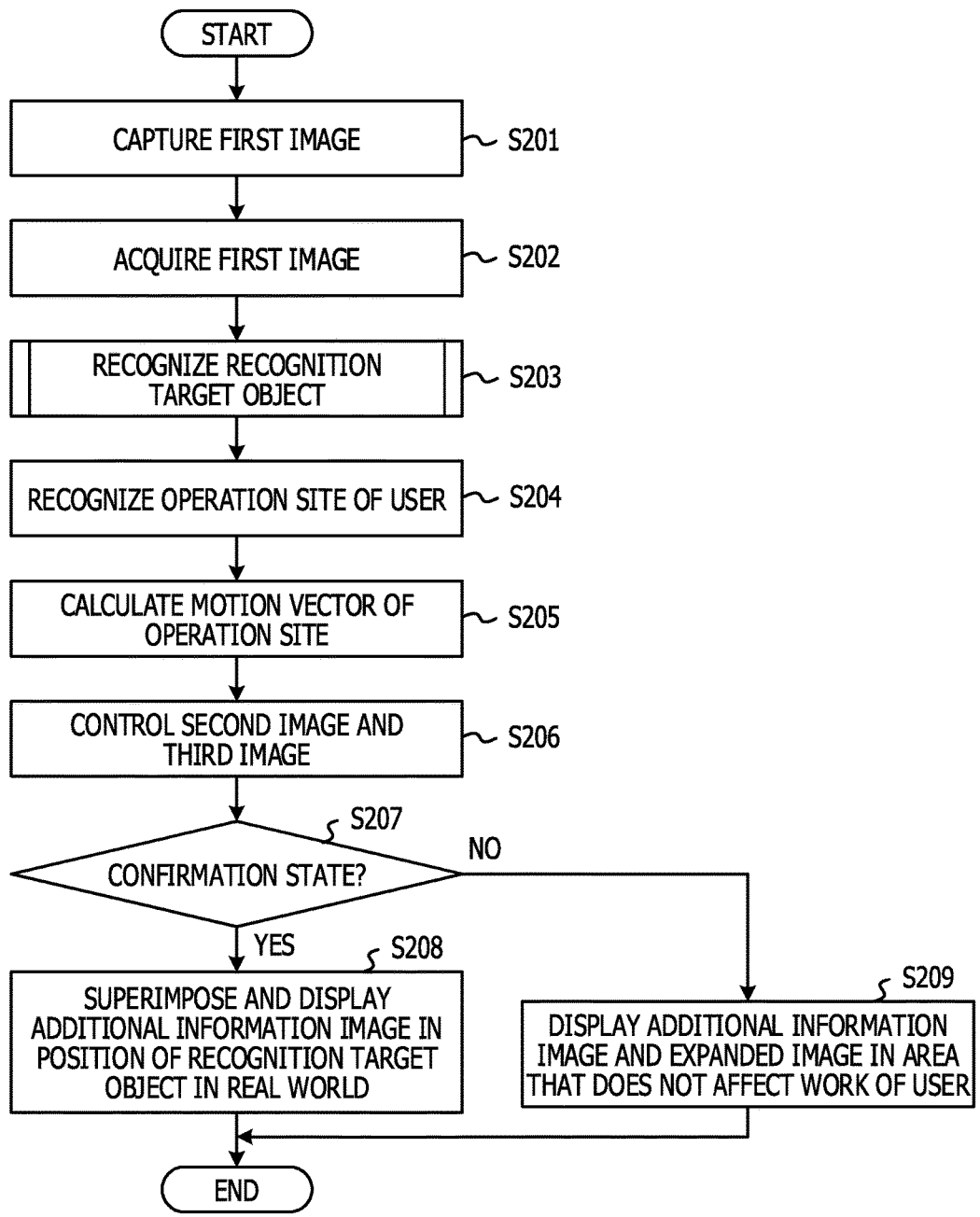
FIG. 2 is a flow chart of image processing performed in an image processing device.

FIG. 2 is a flow chart of image processing performed in the image processing device 1. In the first embodiment, a flow of encoding processing performed by the image processing device 1 illustrated in FIG. 2 will be described in association with the description of each function of the functional block diagram of the image processing device 1 illustrated in FIG. 1.

Figure 3:
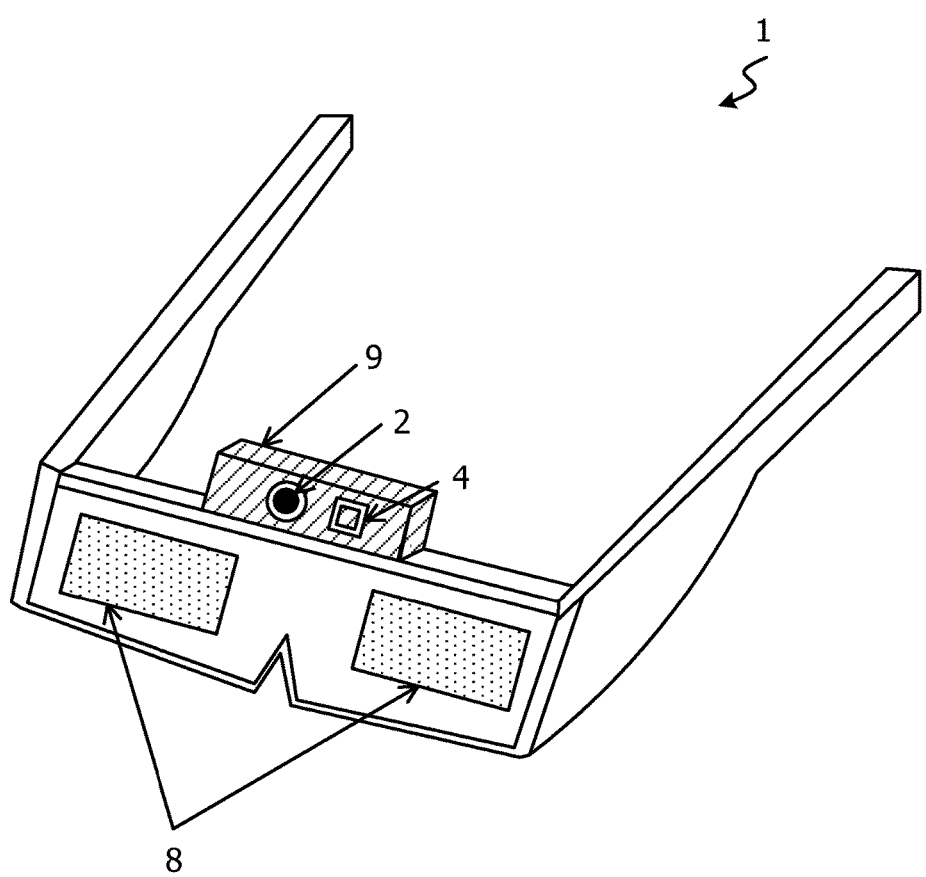
FIG. 3 is a first hardware configuration diagram of an image processing device according to an embodiment.

FIG. 3 is a first hardware configuration diagram of the image processing device 1 according to an embodiment. As illustrated in FIG. 3, the imaging unit 2, the storage unit 4, the display unit 8, and the processing unit 9 of the image processing device 1 are provided to be fixed to, for example, a support body of a spectacle frame type. Note that, in order to make it easier for a user to identify a recognition target object at which the user gazes in the real world (which may be referred to as the outside world), the imaging unit 2 may be provided so as to be located in the center between the both eyes. Although not illustrated in FIG. 3, two or more imaging units 2 may be provided so that a stereo image is used. As the details of the display unit 8 will be described later, in order to enable the user to visually recognize the real world, an optical see-through type display, such as a half mirror and the like, which has certain reflectivity and transitivity, and the like, may be used.

Figure 4A:
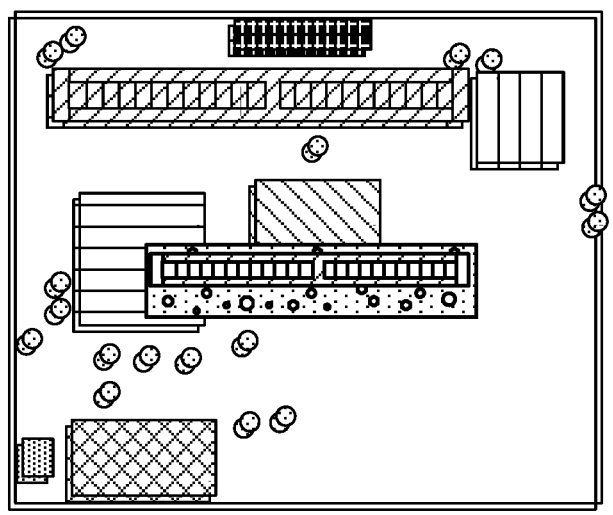
FIG. 4A is a conceptual diagram of a visual recognition state for a recognition target object and an additional information image in a first focal point of a user.
Figure 4B:
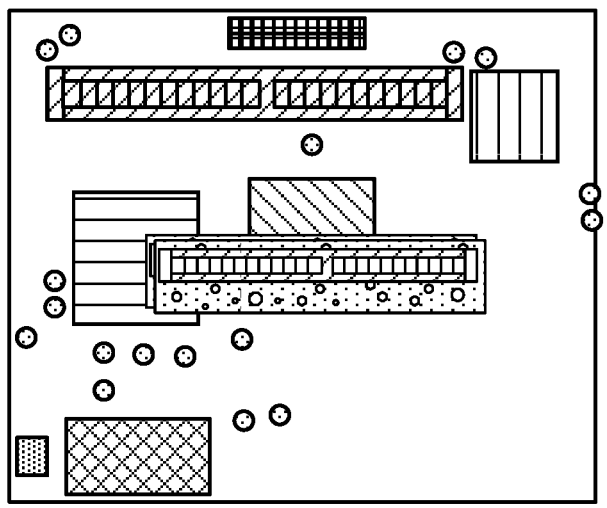
FIG. 4B is a conceptual diagram of a visual recognition state for a recognition target object and an additional information image in a second focal point of a user.

FIG. 4A is a conceptual diagram of a visual recognition state for a recognition target object and an additional information image in a first focal point of the user. FIG. 4B is a conceptual diagram of a visual recognition state for a recognition target object and an additional information image in a second focal point of the user. In FIG. 4A, the user gazes at the additional information image in which a focal point is the first focal point, and therefore, the user is in a visual recognition state where the recognition target object in the real world in which the focal point is the second focal point is blur. On the other hand, in FIG. 4B, the user gazes at the recognition target object in the real world in which the focal point is the second focal point, and therefore, the user is in a visual recognition state where the additional information image in which the focal point is the first focal point is blur. Note that, in FIG. 4A and FIG. 4B, a blur visual recognition state is expressed by depicting the recognition target object or the additional information image in a slightly shifted position. In each of FIG. 4A and FIG. 4B, if there are objects or images with different focal distances in a visual field range (specifically, a central visual field, which will be described later), the eyes of the user unconsciously try to focus on both of the objects or the images and often change the focal distances, and therefore, eye strain is caused.

In FIG. 1 or FIG. 3, the imaging unit 2 is an imaging device, such as a charge coupled device (CCD), a complementary metal oxide semiconductor (CMOS) camera, and the like. The imaging unit 2 is fixedly supported on or attached to, for example, the neck of the user to acquire an image (which may be referred to as a first image) in the visual field direction of the user. Note that the processing corresponds to Step S201 of the flow chart illustrated in FIG. 2. The imaging unit 2 is arranged in the image processing device 1 for convenience of description, but may be arranged outside the image processing device 1 so as to be accessible via a network. The imaging unit 2 captures an image including a recognition target object that is a work target of a user and an operation site of the user. The imaging unit 2 outputs an image (a first image) including the recognition target object and the operation site of the user to the acquisition unit 3.

The acquisition unit 3 is, for example, a hardware circuit of a wired logic. The acquisition unit 3 may be a functional module realized by a computer program executed by the image processing device 1. The acquisition unit 3 receives the image (the first image) including the recognition target object and the operation site of the user from the imaging unit 2. Note that the processing corresponds to Step S202 of the flow chart illustrated in FIG. 2. Also, the function of the imaging unit 2 may be integrated with the acquisition unit 3. The acquisition unit 3 outputs a plurality of images including the recognition target object and the operation site of the user to the recognition unit 5 and the control unit 7.

The storage unit 4 is, for example, a semiconductor memory element, such as a flash memory and the like, or a storage device, such as a hard disk, an optical disk, and the like. Note that the storage unit 4 is not limited to storage devices of the above-described types, may be a random access memory (RAM) or a read only memory (ROM). Features (which may be referred to as first features or a first feature group) of a plurality of recognition target objects (an electronic circuit substrate, a manufacturing machine, and the like), which exist in the outside world and are targets of recognition processing performed by the recognition unit 5 are extracted in advance from images by imaging the recognition target objects in advance, and are stored in the storage unit 4. Additional information images (which may be referred to as second images), which correspond to the recognition target objects may be stored in the storage unit 4. Furthermore, there may be cases where the additional information images stored in the storage unit 4 are not in one-to-one correspondence to the recognition target objects, and a plurality of additional images that correspond to a single recognition target object may be stored therein.

Note that the storage unit 4 is arranged in the image processing device 1 for convenience of description, but may be arranged outside the image processing device 1 so as to be accessible via a network. Various types of programs that are executed by the image processing device 1, which will be described later, including, for example, a basic software, such as an operating system (OS) and the like, a program in which an operation of image processing is defined, are stored in the storage unit 4. Furthermore, various types of data used for executing the program, and the like are stored in the storage unit 4, as appropriate. A configuration in which the various types of data stored in the storage unit 4 may be stored in, for example, a memory or a cache (not illustrated) of the recognition unit 5, the calculation unit 6, and the control unit 7, as appropriate, and the image processing device 1 does not use the storage unit 4 may be employed.

The recognition unit 5 is, for example, a hardware circuit of a wired logic. The recognition unit 5 may be a functional module realized by a computer program executed by the image processing device 1. The recognition unit 5 receives a plurality of images from the acquisition unit 3. The recognition unit 5 extracts features from the plurality of images and associates the extracted features (which may be second features or a second feature group) with the features of recognition target objects stored in the storage unit 4 to recognize at least one recognition target object included in the plurality of images acquired by the acquisition unit 3. Note that the processing corresponds to Step S203 of the flow chart illustrated in FIG. 2.

FIG. 5 is a flow chart of recognition processing of recognizing a recognition target object performed by the recognition unit 5. Note that the flow chart illustrated in FIG. 5 corresponds to the detailed flow chart of Step S203 of FIG. 2. First, the recognition unit 5 receives a plurality of images with different acquisition times from the acquisition unit 3 and extracts a feature from each of the plurality of images (for each frame) (Step S501). Note that features that are extracted are normally plural in number, and therefore, an aggregation of a plurality of features may be defined as a feature group.

The features extracted in Step S501 may be features for which a so-called descriptor that is a feature amount vector for each feature is calculated. For example, scale invariant feature transform (SIFT) features or speeded up robust features (SURF) may be used. Note that a method for extracting SIFT features is described, for example, in U.S. Pat. No. 6,711,293. A method for extracting SURF is described, for example, in H. Bay et. al. "SURF: Speeded Up Robust Features", Computer Vision and Image Understanding, Vol. 110, No. 3, pp. 346-359, 2008.

Next, the recognition unit 5 determines whether or not a cross-check of the feature group (which may be referred to as the second feature group) extracted by the recognition unit 5 in Step S501 and all of candidate feature groups of the recognition target objects stored in the storage unit 4 is completed (Step S502). Note that it is assumed that, as a feature group of a recognition target object stored in the storage unit 4, the above-described SIFT features and SURF are stored in advance. In Step S502, if the cross-check is not completed (NO in Step S502), the recognition unit 5 selects arbitrary one of the recognition target objects stored in the storage unit 4 in advance (Step S503). Next, the recognition unit 5 reads out the feature group of the recognition target object selected in Step S503 from the storage unit 4 (Step S504). The recognition unit 5 selects an arbitrary one feature from the feature group extracted in Step S504 (Step S505).

The recognition unit 5 retrieves association of the one feature selected in Step S505 and the feature of the recognition target object read out and selected in Step S504 with each other. As a retrieval method, matching processing by general corresponding point retrieval may be used. Specifically, the recognition unit 5 calculates a distance d of the one feature selected in Step S505 and each feature group of the recognition target object read out and selected in Step S504 (Step S506).

Next, the recognition unit 5 performs threshold determination in order to perform determination of validity of feature association. Specifically, the recognition unit 5 calculates the smallest value d1 of the calculated distance d and the second smallest value d2 thereof in Step S506. Then, the recognition unit 5 determines whether or not a condition in which each of the distances of d1 and d2, which are threshold determination, is a predetermined distance or more (for example, d1 is a smaller value than a value obtained by multiplying d2 by 0.6) and d1 is a predetermined value or less (for example, less than 0.3) is satisfied (Step S507). If the condition of the threshold determination is satisfied (YES in Step S507), the recognition unit 5 performs feature association (Step S508). If the condition of the threshold determination is not satisfied (NO in Step S507), the recognition unit 5 does not perform feature association and causes the process to proceed to Step S509.

The recognition unit 5 determines whether or not the feature groups read out in Step S504 and the feature groups extracted in Step S501 are all cross-checked (Step S509). In the case where cross-check processing is completed (YES in Step S509), if all of cross-checks have ended in Step S502 (YES in Step S502), the recognition unit 5 causes the process to proceed to Step S510. If cross-check processing is not completed (NO in Step S509), the recognition unit 5 causes the process to proceed to Step S505. Then, the recognition unit 5 recognizes, based on the number of features associated in Step S508, a recognition target object included in an image acquired by the acquisition unit 3 (Step S510). Note that the feature groups stored in the storage unit 4, which have been associated in Step S510, may be referred to as the first features or the first feature groups.

In the above-described manner, the recognition unit 5 recognizes, from an image acquired from the acquisition unit 3, a recognition target object included in the image. Note that the recognition unit 5 may set a key frame in which recognition processing is performed for each predetermined time without performing the above-described recognition processing in all of a plurality of images received from the acquisition unit 3, thereby enabling reduction in processing cost.

The recognition unit 5 of FIG. 1 further recognizes an operation site of the user from an image (the first image) received from the acquisition unit 3. Note that the processing corresponds to Step S204 of the flow chart illustrated in FIG. 2. The operation site of the user is, for example, a finger. As a method for recognizing a finger, the recognition unit 5 may use a method for estimating the position of a finger by image processing, which is described in, for example, Japanese Patent No. 3863809. In the first embodiment, for convenience of description, assuming that the recognition unit 5 uses the method described in Japanese Patent No. 3863809, the following description will be made. In the method, the recognition unit 5 takes out (extracts), for example, a flesh color component part from an image received from the acquisition unit 3 to extract a hand area outline. Thereafter, the recognition unit 5 recognizes the number of hands and thus performs finger recognition processing, based on the hand area outline. Note that the recognition unit 5 may use appropriate threshold adjustment for an RGB space and an HSV space in extraction of a flesh color component. The recognition unit 5 outputs a recognition result regarding the recognition target object and the operation site to the calculation unit 6.

The calculation unit 6 is, for example, a hardware circuit of a wired logic. The calculation unit 6 may be a functional module realized by a computer program executed by the image processing device 1. The calculation unit 6 receives recognition result regarding the recognition target object and the operation site from the recognition unit 5. The calculation unit 6 calculates a motion vector including information of the moving amount of the recognition target object recognized by the recognition unit 5 and the moving amount and moving direction of the operation site of the user from a plurality of images with different acquisition times, which are acquired by the acquisition unit 3. Note that the processing corresponds to Step S205 of the flow chart illustrated in FIG. 2. The calculation unit 6 may calculate the moving amount of the recognition target object using a general method using an optical flow. The calculation unit 6 may use, as a method for calculating a motion vector of a finger that is an operation site of a user, for example, a method described in Yamashita et. al. "Hand Shape Recognition Using 3D Active Appearance Models", Meeting on Image Recognition and Understanding, MIRU 2012, IS3-70, 2012-08" in which learning data regarding a hand shape is held in advance and the degree of similarity between an acquired image and the learning data at the current time is calculated to estimate a finger shape. The calculation unit 6 may set an arbitrary reference point for an estimated finger, and thus, calculate, as a motion vector, the moving amount and moving direction of the reference point.

Figure 6:
FIG. 6 is an example table including a data structure of the moving amount of a recognition target object calculated by a calculation unit.

FIG. 6 is an example table including a data structure of the moving amount of a recognition target object calculated by the calculation unit 6. Note that the calculation unit 6 may store a table 60 of FIG. 6 in a cache or a memory (not illustrated) of the calculation unit 6, or in the storage unit 4. In the table 60 of FIG. 6, for example, the left upper end of an image acquired by the acquisition unit 3 may be set to be an origin. Note that TX and TY, which indicate a recognition target object position on the image in the table 60 of FIG. 6, are coordinates of an arbitrary reference point of the recognition target object relative to the origin of an image in a lateral direction and a longitudinal direction, and are represented in units of pixels. An arbitrary reference point may be set, for example, to be at the center of the recognition target object. The table 60 of FIG. 6 is an example data structure when a situation where the captured image resolution of the imaging unit 2 is 640 pixels in width and 480 pixels in height and a recognition target object exists about 30 cm ahead of the imaging unit 2 is assumed in moving picture image capturing. Furthermore, the table 60 of FIG. 6 indicates a state where the recognition unit 5 recognizes a recognition target object, in the 100th (image) frame, in a captured image and continuously recognizes the recognized target object in subsequent frames.

In the table 60 of FIG. 6, if it is assumed that the coordinate values of a recognition target object in the Nth frame are TXN and TYN, the calculation unit 6 may calculate, for example, a TX change amount and a TY change amount in a 101 frame using the following expressions.

$$TX \text{ change amount } 101 = TX101 - TX100$$

$$TY \text{ change amount } 101 = TY101 - TY100 \quad \text{(Expressions 1)}$$

The calculation unit 6 calculates an average absolute value of the moving amount of the recognition target object between predetermined frames from the table 60 of FIG. 6. For example, if the number of the predetermined frames is 5, the average absolute value of the moving amount of the recognition target object from a 101 frame to a 105 frame is (13.2, 23.2). Note that, for convenience of description, the average absolute value of the moving amount of the recognition target object is referred to as the average moving amount of the recognition target object. In the first embodiment, if the average moving amount of the recognition target object is less than a predetermined threshold, it is determined that the user is in a "confirmation state" where the user gazes at a recognition target object that is a work target and has not started a work yet. If the average moving amount of the recognition target object is the predetermined threshold or more, the calculation unit 6 may instruct the recognition unit 5 to execute recognition processing for the recognition target object, and also may continuously execute calculation processing for the average moving amount of the recognition target object.

The above-described threshold may be defined in accordance with the distance between the imaging unit 2 and the recognition target object and the imaging field angle and image resolution of the imaging unit 2, as appropriate, but, in the first embodiment, the threshold may be defined to be, for example, 50 pixels. In the example illustrated in the table 60 of FIG. 6, the average moving amount is (13.2, 23.2) and is less than the threshold, and therefore, the calculation unit 6 determines that the user is in a confirmation state. In this case, the calculation unit 6 may read out an additional information image corresponding to the recognition target object from the storage unit 4 and cause the display unit 8 of FIG. 1 to superimpose the additional information image on the recognition target object and thus display the acquired image. Thus, the user is enabled to correctly perceive the recognition target object that is a work target. In this case, the display unit 8 is caused to display an expanded image, which will be described later, with the additional information image.

If the calculation unit 6 determines that the user is in a confirmation state, the calculation unit 6 calculates a motion vector including information of the moving amount and moving direction of the operation site of the user. Note that, in the first embodiment, as described above, an example where a finger is used as an example of the operation site is described. FIG. 7 is an example table including a data structure of a motion vector of an operation site calculated by the calculation unit 6. Note that the calculation unit 6 may store a table 70 of FIG. 7 in a cache or a memory (not illustrated) of the calculation unit 6, or the storage unit 4. In the table 70 illustrated in FIG. 7, for example, the left upper end of an image acquired by the acquisition unit 3 may be set to be an origin. Note that TX and TY, which indicate a recognition target object position, and HX and HY, which indicate a finger position, in the table 70 of FIG. 7 are coordinates of an arbitrary reference points of the recognition target object and the finger relative to the origin of an image in a lateral direction and a longitudinal direction, and are represented in units of pixels.

Similar to the table 60 of FIG. 6, an arbitrary reference point of a recognition target object may be set, for example, to be at the center of the recognition target object. An arbitrary reference point of the finger may be set to be at an elliptical center when the shape of the finger is elliptically approximated. Similar to the table 60 of FIG. 6, the table 70 of FIG. 7 is an example data structure when a situation where, in moving picture image capturing, the captured image resolution of the imaging unit 2 is 640 pixels in width and 480 pixels in height and a recognition target object exists about 30 cm ahead of the imaging unit 2 is assumed. Furthermore, the table 70 of FIG. 7 indicates a state where the recognition unit 5 recognizes a finger, in addition to a recognition target object, in the 200th (image) frame in a captured image, and continuously recognizes the recognized target object and the finger in subsequent frames.

In the table 70 of FIG. 7, if it is assumed that the coordinate values of the finger in the Nth frame are HXN and HYN, the calculation unit 6 may calculate an HX change amount and an HY change amount in the Nth frame using the following expressions. Note that, in the following expressions, the HX change amount and the HY change amount are calculated from a difference between the relative positions in the Nth frame and a previous frame, that is, N−1 frame.

$$HX \text{ change amount } N=(HXN-TXN)-(HXN-1-TXN-1)$$

$$HY \text{ change amount } N=(HYN-TYN)-(HYN-1-TYN-1) \quad \text{(Expressions 2)}$$

The calculation unit 6 may calculate the moving direction (an angle) of the finger in the Nth frame and the position direction (an angle) of the recognition target object relative to the position of the finger using the following expressions. Note that, in the following expressions, the moving direction N of the finger and the position direction N of the recognition target object, the base point of which is the position of the finger, are calculated from the position of the finger and the position of the recognition target object in the N frame and those in the previous frame, that is, the N−1 frame.

$$\text{Finger moving direction } N=\arctan(HX \text{ change amount } N/HY \text{ change amount } N)$$

$$\text{Recognition target object position direction } N=\arctan((TXN-HXN)/(TYN-HYN)) \quad \text{(Expressions 3)}$$

The calculation unit 6 may calculate a direction difference in the Nth frame of the table 70 of FIG. 7 using the following expression. Note that, in the following expression, the direction difference is calculated from the absolute value of a difference between the moving direction N of the finger and the position direction N of the recognition target object.

$$\text{Direction difference}=|\text{Finger moving direction } N-\text{Recognition target object position direction } N| \quad \text{(Expression 4)}$$

The calculation unit 6 accumulates the direction differences for predetermined frames in the table 70 of FIG. 7 and compares the direction differences to a predetermined threshold. If a state where the direction difference is less than the predetermined threshold for the predetermined frames continues, the calculation unit 6 may determine that the finger of the user moves toward the recognition target object in order for a user to start a work. Note that the predetermined threshold may be defined in accordance with a distance between the imaging unit 2 and the recognition target object and the imaging field angle and image resolution of the imaging unit 2, as appropriate, but, in the first embodiment, the threshold may be defined to be, for example, 10 degrees. The threshold may be referred to as a fourth threshold. In table 70 of FIG. 7, for example, the number of the predetermined frames is 5, the largest direction difference is 9.6 degrees from a 201 frame to a 205 frame. In this case, each of the direction differences in the predetermined frames is less than the threshold, and therefore, it is determined that the finger moves toward the recognition target object.

The calculation unit 6 may regard absolute values of the HX change amount and the HY change amount in the table 70 of FIG. 7 as the moving amount (the moving speed) of the finger per unit time. If the moving amount of the finger is the predetermined threshold or more, the calculation unit 6 may determine that the finger moves in order to start a work. The predetermined threshold may be defined in accordance with a distance between the imaging unit 2 and the recognition target object and the imaging field angle and image resolution of the imaging unit 2, as appropriate, but, in the first embodiment, the threshold may be defined to be, for example, 20 pixels. In the table 70 of FIG. 7, the smallest absolute value of the HX change amount and the HY change amount is 22 pixels, which is greater than the predetermined threshold, and therefore, the calculation unit 6 determines that the finger moves in order to start a work. Note that the threshold may be referred to as a third threshold. Furthermore, a threshold obtained by combining the third threshold and the fourth threshold together, as appropriate, may be referred to as a first threshold.

In the first embodiment, if a difference in direction (the moving direction) of the finger, which is an example of the operation site of the user, is less than the predetermined threshold, or if the moving amount is the predetermined threshold or more, it is determined that the user is in an "operation state" where the user performs a work on the recognition target object. In performing the above-described operation state determination processing, the calculation unit 6 may use only one of the difference in direction (the moving direction) of the finger and the moving amount, and may use both of the difference in direction of the finger and the moving amount (the moving direction). Information of the difference in direction (the moving direction) of the finger and the moving amount may be referred to as a motion vector. Note that, if the calculation unit 6 does not determine that the user is in an operation state, the calculation unit 6 may instruct the recognition unit 5 to execute recognition processing for the recognition target object, and may continuously execute calculation processing for each data illustrated in the table 70 of FIG. 7. If the recognition unit 5 recognizes one or more fingers, that is, both hands, the calculation unit 6 may perform processing only on a finger that the recognition unit 5 recognized first. The calculation unit 6 outputs calculation results regarding the recognition target object and the operation site illustrated in the table 70 of FIG. 7 to the control unit 7.

The control unit 7 of FIG. 1 is a hardware circuit of a wired logic. The control unit 7 may be a functional module realized by a computer program executed by the image processing device 1. The control unit 7 receives an additional information image corresponding to the recognition target object which the recognition unit 5 recognized from the storage unit 4. The control unit 7 receives an image (a first image) including the recognition target object that is a work target of a user and the operation site of the user from the acquisition unit 3. Furthermore, the control unit 7 receives calculation results regarding the recognition target object and the operation site from the calculation unit 6.

The control unit 7 controls display of an additional information image (a second image) including information corresponding to the recognition target object in the image (the first image) including the recognition target object that is a work target of the user and an operation site of the user and an expanded image (which may be referred to as a third image) formed so as to be inscribed in the outer edge of the additional information image and covers the entire central visual field of the user for the additional information image. Note that the processing corresponds to Step S206 in the flow chart illustrated in FIG. 2. The control unit 7 controls the outer edge of the expanded image, based on a focal distance (in other words, a display position of the second image corresponding to the focal distance of the user) relative to the additional information image and an angle relative to a vertical line of each of the foveae of the user's eyes, which is defined based on the central visual field of the user. The control unit 7 performs control such that the brightness of the expanded image is the brightness of the recognition target object in the real world or more, or the expanded image does not have a texture feature amount. Furthermore, the control unit 7 defines the outer edge of the additional information image, based on the length of the outer edge of the recognition target object in the first image, and defines the outer edge of the expanded image by extending the length based on the focal distance and a tangent of the angle in a direction in which the expanded image includes the additional information image from the outer edge of the additional information image. Note that a control method of the control unit 7 will be described in detail later.

Figure 8A:
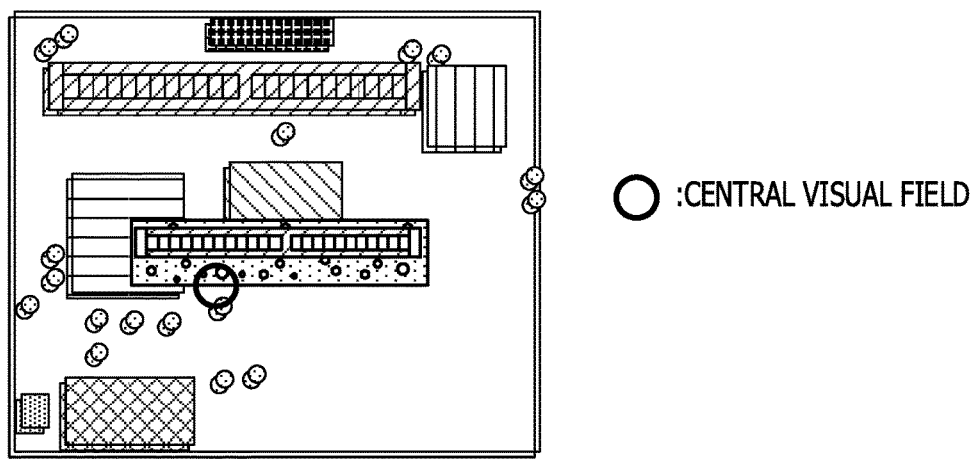
FIG. 8A is a relationship diagram of the central visual field of a user, a recognition target object, and an additional information image.
Figure 8B:
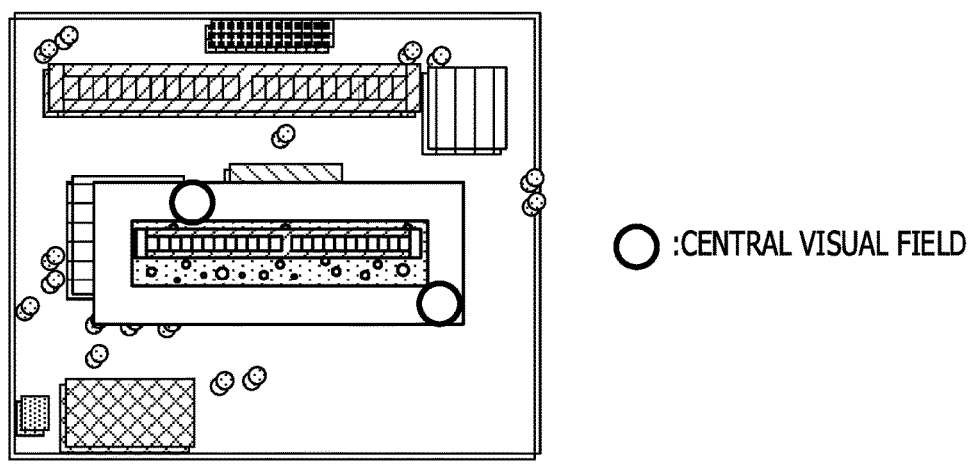
FIG. 8B is a conceptual diagram of an expanded image.

An aspect of a technical significance of the present disclosure will be described. FIG. 8A is a relationship diagram of the central visual field of a user, a recognition target object, and an additional information image. FIG. 8B is a conceptual diagram of an expanded image. As illustrated in FIG. 8A, if there are objects or images with different focal distances in the central view field of the user, the user's eyes unintentionally try to focus on both of the objects or the images, and thus, often change the focal differences. On the other hand, if all of the focal distances of objects each of which is located in the central visual field and has an appearance with a feature are the same, the focal distances are fixed to those of the objects each of which has an appearances with a feature (in other words, objects each of which has a texture feature amount) and are not often changed. Therefore, as illustrated in FIG. 8B, an expanded area (which may be referred to as a third image) which corresponds to a central field angle (for example, the central field angle=5-10 degrees) and on which it is difficult to focus is provided on a boundary between objects which have different focal distances and have appearances with features (in other words, a boundary between the additional information image and the recognition target object in the real world), and thus, two objects or images with different focal distances do not exist together in the central field. Note that the expanded area is made so as not to have a texture feature amount and thus a trigger that causes the user to focus on the expanded area may be caused to disappear. Thus, the user is enabled to increase visibility of the additional information image (or the recognition target object in an actual image in the central visual field). Note that, in an area (in which there is not a visual target that is to be adjusted), that is, a so-called empty field, in which there is not a visual target and which does not have a texture feature amount, a focal position exists in a position about 1.5 D (=about 66 cm) closer than a distant point referred to as a resting state of accommodation (see, for example, Ihi "Techno-stress eye symptoms and eye accommodation", Japanese Journal of Occupational Medicine and Traumatology, 51, pp. 121-125, 2003"). In the expanded area, the brightness is set to be higher than that of the recognition target object in the real world such that the recognition target object in the real world is hidden.

(First Method for Controlling Expanded Image)

Figure 9:
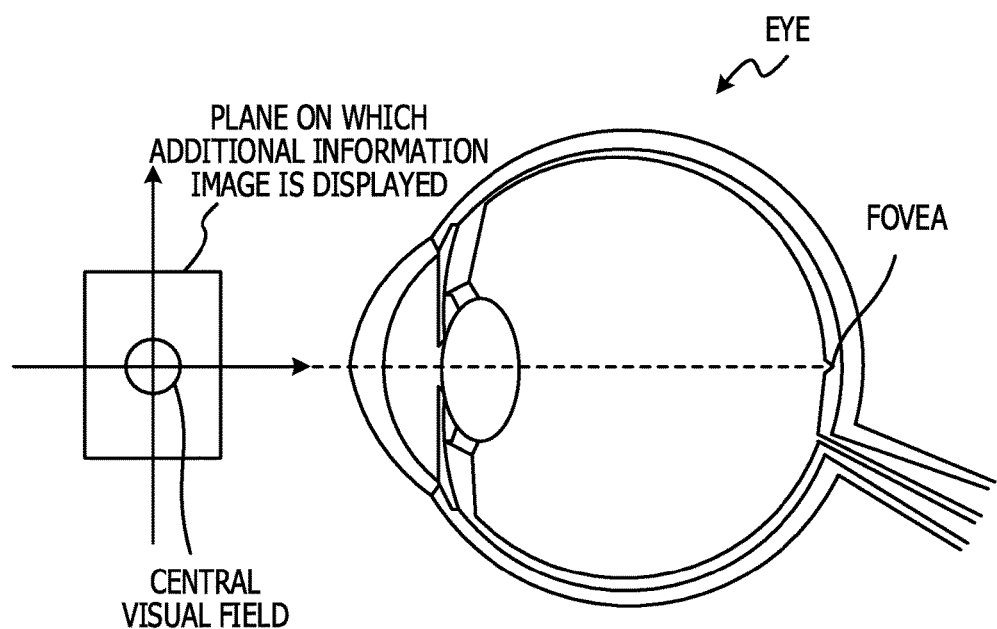
FIG. 9 is a conceptual diagram of the central visual field of a user.

The control unit 7 defines an outer edge of an additional information image, based on the length of the outer edge of a recognition target object recognized by the recognition unit 5 on an image. The control unit 7 may cause, for example, the length of the outer edge of the additional information image to match the length of the outer edge of the recognition target object on the image. Thus, the additional information image may be superimposed on the recognition target object in the real world, which the user visually recognizes, and thus displayed an acquired image. The control unit 7 defines the outer edge of an expanded image by extending the length based on the tangent of an angle relative to a vertical line (which may be referred to as a sight line) of each of the foveae of the user, which is defined based on a focal distance relative to the additional information image and the central visual field of the user in a direction in which the expanded image includes the additional information image from the outer edge of the additional information image. FIG. 9 is a conceptual diagram of the central visual field of a user. In FIG. 9, for example, the central visual field defined on a plane at a focal distance (for example, 1.0 (m)) on which the additional information image is displayed and a vertical line relative to the fovea of one of the eyes of the user are illustrated. Note that the vertical line may be regarded as the visual direction of the user. In general, since the angle relative to the vertical line is assumed to be 5-10 degrees, the range of the central visual field may be handled as a circle having a radius defined in accordance with the focal distance relative to the additional information image. If the angle relative to the vertical line relative to the fovea is a degrees (for example, a=5 degrees) and the focal distance of the additional information image is Ls (for example, Ls=1.0 (m)), a radius Cs of the central visual field on the plane on which the additional information image is displayed may be represented by the following expression.

$$Cs = \tan(a \text{ degrees}) \times Ls \quad \text{(Expression 5)}$$

In Expression 5, a value obtained by doubling Cs is the central visual field, and therefore, the control unit 7 may define the outer edge of the expanded image by extending the value obtained by doubling Cs in a direction in which the expanded image includes the additional information image from the outer edge of the additional information image. Note that the control unit 7 may define the outer edge of the expanded image by extending a greater value than the value obtained by doubling Cs in a direction in which the expanded image includes the additional information image from the outer edge of the additional information image.

(Second Method for Controlling Expanded Image)

The control unit 7 acquires a distance Lo from the fovea of the user to the recognition target object in the real world. Note that, for example, the size of the recognition target object in the real world may be stored in the storage unit 4 in advance and the distance Lo may be calculated using the size of the recognition target object on the first image and the imaging focal distance of the imaging unit 2. If a plurality of imaging units 2 are used, the distance Lo may be calculated using a so-called stereo method. The distance Lo may be regarded as a focal distance relative to the recognition target object in the real world. In this case, if it is assumed that an upper surface of the recognition target object in the real world is a square plane and the length of a side of the plane is Po, a length Ps of a side of the additional information image superimposed on the recognition target object in the real world and thus displayed may be represented by the following expression.

$$Ps = Po \times Ls / Lo \quad \text{(Expression 6)}$$

Note that it is assumed that, in Expression 6, Po is stored, for example, in the storage unit 4 in advance. Ls is a focal distance relative to the additional information image.

If the display field angle and display resolution of the display unit 8 of FIG. 1 are a display field angle (the horizontal direction ±dh, the vertical direction ±dv) and a display resolution (the horizontal direction rh, the vertical direction rv), respectively, and the origin on the plane on which an additional information image is displayed is the central visual field, the coordinates (ph, pv) of a point located in a position distant from the origin by Ps/2 in the horizontal direction and by Ps/2 in the vertical direction may be represented by the following expressions.

$$ph=(Ps/2)\times rh/(2\times\tan(dh)\times Ls)$$

$$pv=(Ps/2)\times rv/(2\times\tan(dv)\times Ls) \quad \text{(Expressions 7)}$$

The control unit 7 may define coordinate values on the plane on which the additional information image for the recognition target object in the real world that the user visually recognizes, based on Expressions 7. Note that, if the central visual field is presented by the coordinate values on the plane on which the additional information image is displayed, the central visual field is a circle represented by coordinates (Cx, Cy) represented by the following expressions.

$$Cx=(Cs\times rh/(2\times\tan(dh)\times Ls))\times\cos\theta+xo$$

$$Cy=(Cs\times rv/(2\times\tan(dv)\times Ls))\times\sin\theta+yo \quad \text{(Expressions 8)}$$

Note that, in Expressions 8, xo and yo are the origin (central coordinates) on the plane on which the additional information image is displayed and θ is 0-2 π. Note that Cs may be defined based on Expression 5.

The control unit 7 may draw a circle with the same field angle as that of the central visual field on the plane on which the additional information image is displayed, based on Expressions 8. The control unit 7 may draw the circle along the outer edge of the additional information image. For example, if it is assumed that the focal distance Lo for the recognition target object in the real world is Lo=0.50 (m), the focal distance Ls relative to the additional information image is Ls=1.00 (m), and the length Po of a side of the upper surface (assumed to have a square shape) of the recognition target object in the real world is Po=0.10 (m), Ps=0.20 (m) is obtained based on Expression 6. If the angle relative to the vertical line relative to the fovea of the user is defined to be a=5 degrees, Cs=0.087 (m) is obtained based on Expression 5. In this case, if, assuming that the display field angle (the horizontal direction ±dh, the vertical direction ±dv) is (±dh=±18.9 degrees, ±dv=±15.3 degrees), and the display resolution (the horizontal direction rh, the vertical direction rv) is (1280 (pixels), 1024 (pixels)), (ph, pv) and (Cx, Cy) are calculated based on Expressions 7 and Expressions 8, (ph, pv) and (Cx, Cy) are represented by (ph, pv)=(186, 187), (Cx, Cy)=(162×cos θ+xo, 162×sin θ+yo). As described above, the control unit 7 may define the outer edge of the expanded image using Expressions 7 and Expressions 8.

In the first method for controlling an expanded image or the second method for controlling an expanded image, which have been described above, the control unit 7 performs control such that the brightness of the expanded image is greater than the brightness of the recognition target object in the real world. Note that the brightness of the recognition target object in the real world may be considered as the illuminance of an environment in which the image processing device 1 is used. For example, if, in an environment with an illuminance 270lx, using the display unit 8 with which the greatest display brightness is 300 cd/m², a uniform white expanded image (RGB values, (R: 200, G: 200, B: 200)) which does not have a texture feature amount is displayed, the expanded image may hide the recognition target object in the real world. Therefore, the control unit 7 converts a work target image included in an image (a first image) captured by the imaging unit 2 to an average RGB image and calculates a brightness value Y1, based on the following expression.

$$Y1(Y2)=(0.298912\times R+0.586611\times G+0.114478\times B) \quad \text{(Expression 9)}$$

The control unit 7 may set, as the brightness value of the expanded image, an arbitrary brightness value Y2, which is greater than the value of Y1 calculated using Expression 9. Note that the color phase of the expanded image may be, for example, white, but is not limited to white. The color phase of the expanded image and the color phase of the recognition target object may be the same. For example, if the RGB values of the recognition target object are those of dark yellow (RGB values, (R: 128, G: 128, B: 0) and the RGB values of the expanded image are those of bright yellow (RGB values, (R: 255, G: 255, B: 0), Y1=113.3 and Y2=225.8 are obtained based on Expression 9, and the expanded image may hide the recognition in the real world.

The control unit 7 performs control to cause the display unit 8 to display the additional information image and the expanded image. The control unit 7 causes the display unit 8 to display the additional information image such that the additional information image corresponds to (is superimposed on) the position of the recognition target object in the real world. The expanded image may be displayed in accordance with the display position of the additional information image, as appropriate.

The control unit 7 superimposes the additional information image on the position of the recognition target object in the real world and thus displays an acquired image, and displays the expanded image, based on the display position of the additional information image. Note that the processing corresponds to Step S207 to Step S209 of the flow chart illustrated in FIG. 2. If the motion vector of an operation site of a user is a predetermined amount or more (for example, the above-described first threshold or more), the control unit 7 may assume that the user has started a work on the recognition target object in the real world and thus cause the display unit 8 to stop displaying the additional information image and the expanded image. However, there are cases where it is preferable that, if the user actually performs a work, the user may directly see the recognition target object in the real world, and therefore, the additional information image and the expanded image are displayed in an area which does not affect a work of the user. Note that the display position of the expanded image may be uniquely determined in accordance with the additional information image, and therefore, in the first embodiment, control of the display position of an additional information image will be described with a central focus thereon. For example, if the user is in the above-described confirmation state (which corresponds to YES in Step S207 of FIG. 2), the control unit 7 may superimpose the additional information image on the position of the recognition target object in the real world and thus display an acquired image, and may display the expanded image, based on the display position of the additional information image (which corresponds to Step S208 of FIG. 2). Furthermore, for example, if the user is in the above-described operation state (which corresponds to NO in Step S207 of FIG. 2), the control unit 7 may perform control for displaying the additional information image and the expanded image in an area which does not affect a work of the user (which corresponds to Step S209 of FIG. 2). The control unit 7 controls the display position of the additional information image that corresponds to the recognition target object to a position other than the positions of the recognition target object and the operation site of the user and causes the display unit 8 to display the controlled additional information image. In other words, the control unit 7 controls the display position of the additional information image to a position where the recognition target object is mediated by the motion vector and the additional information image, and a position with which a distance between the reference position (for example, a work position that is the position of a work target of the user) of the recognition target object and the reference position (for example, a work position) of the additional information image is the smallest.

The control unit 7, for example, approximates the recognition target object to a rectangular area, and calculates an angle of the normal direction of each side of the acquired approximate rectangular area relative to the moving direction of a finger. The control unit 7 compares, for example, the moving direction of the finger to the normal direction of each side, and sets a direction in which an interior angle difference is less than a predetermined angle (for example, 90 degrees) as a candidate display direction of the additional information image. The control unit 7 calculates a distance between a work position of the recognition target object and a virtual work position of the recognition target object indicated by the additional information image when the control unit 7 controls the display position of the additional information image to the candidate display direction, and controls the display positions of the additional information image and the expanded image by selecting an area in which the distance is the smallest.

Figure 10:
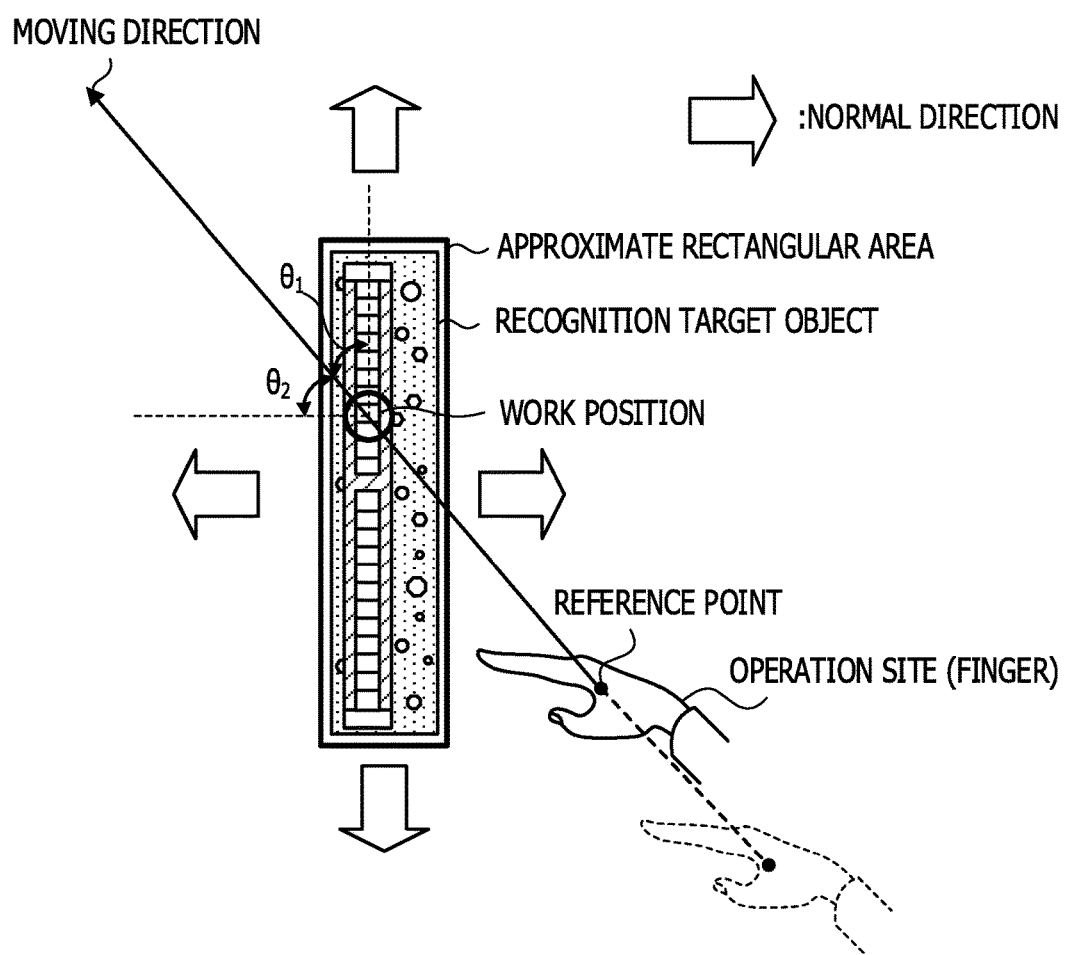
FIG. 10 is a conceptual diagram of candidate display directions of an additional information image and an expanded image display direction.

FIG. 10 is a conceptual diagram of candidate display directions of an additional information image and an expanded image display direction. In FIG. 10, it is assumed that the reference point of a finger of a user moves such that the moving direction is the upper left oblique direction. In FIG. 10, as described above, the control unit 7 approximates the recognition target object to a rectangular area and calculates an angle of the normal direction of each side of the approximate rectangular area relative to the moving direction of the finger. In FIG. 10, a difference between the interior angles $\theta_1$ and $\theta_2$ is less than 90 degrees, for the work position of the recognition target object, an upper direction and a left direction are candidate display directions for the additional information image and the expanded image.

FIG. 11A is a relationship diagram of a work position of a recognition target object and a line segment of each side in an approximate rectangular area. FIG. 11B is a table illustrating an example data structure of a line segment of each side in the approximate rectangular area. FIG. 11C is a conceptual diagram of candidate display positions of an additional information image and an expanded image. The sizes of the recognition target object and the approximate rectangular area in FIG. 11A are dependent on the imaging conditions of the imaging unit 2. Work position coordinates ($W_X$, $W_Y$) are stored, for example, in the storage unit 4 in association with the recognition target object in advance. Note that the origin of the work position coordinates ($W_X$, $W_Y$) may be, for example, the left upper end of an image acquired by the acquisition unit 3. A table 11 of FIG. 11B indicates a basic distance to each side of the approximate rectangular area using the work position of the recognition target object stored in the storage unit 4 as a base point. In other words, the table 11 of FIG. 11B indicates a relative distance to each side of the approximate rectangular area using the work position of the recognition target object as a base point, which does not depend on the imaging conditions of the imaging unit 2. Note that the control unit 7 may select the additional information image corresponding to the attitude of the recognition target object acquired by the acquisition unit 3 from the storage unit 4, and also, the control unit 7 may perform magnification and reduction processing of magnifying or reducing the additional information image to the same size of the recognition target object. Therefore, the control unit 7 may perform magnification and reduction processing for the additional information image in accordance with the size (area) of the recognition target object on the image even when the recognition target object and the additional information image are superimposed and thus displayed. In this case, assuming that the ratio of magnification and reduction is a (for example, $\alpha=5$), using various types of data illustrated in FIG. 11B, the distance of the line segment of each side illustrated in FIG. 11A may be calculated using the following expressions.

$$S_T = \alpha \times SO_T$$

$$S_L = \alpha \times SO_L$$

$$S_B = \alpha \times SO_B$$

$$S_R = \alpha \times SO_R \quad \text{(Expressions 10)}$$

In FIG. 11C, assuming that a distance between a virtual work position of the additional information image and a work position of the recognition target object when the additional information image and the expanded image are displayed above the recognition target object is LT and a distance between the work positions when the additional information image and the expanded image are displayed on the left of the recognition target object is LL, the distance LT and the distance LL are calculated as indicated by the following expressions.

$$LT = S_T \pm S_B = 95$$

$$LL = S_R \pm S_L = 20 \quad \text{(Expressions 11)}$$

Note that, in Expressions 11, the unit is pixel. Since the distance LL is the smallest distance, the control unit 7 controls an area position that satisfies the condition of the distance LL as a display position for the additional information image and the expanded image. The control unit 7 outputs the additional information image the display position of which is controlled to the display unit 8.

The control unit 7 may also calculate the work position coordinates ($W_X$, $W_Y$) and the inclination of each side of the approximate rectangular area from the position, attitude, area, and the like of the recognition target object on the image, which are variable depending on the imaging conditions of the imaging unit 2. The control unit 7 may calculate the distance of the line segment of each side of the approximate rectangular area illustrated in FIG. 11A using the inclination of each side of the approximate rectangular area and the coordinate values of the work position. The distance of the line segment of each side of the approximate rectangular area is, for example, $S_T=40$, $S_L=8$, $S_B=55$, and $S_R=12$.

The display unit 8 of FIG. 1 or FIG. 3 is, for example, a display device, such as an optical see-through type display, such as a half mirror and the like, which has certain reflectivity and transitivity, and the like, in order to enable the user to visually recognize the real world. In a state where the user directly visually recognizes a recognition target object in the real world due to transmission of light, the display unit 8 displays an additional information image (a second image) and an expanded image (a third image) such that the additional information image and the expanded image are caused to correspond to the position of the recognition target object in the real world by reflection of light. For example, the display unit 8 receives the additional information image and the expanded image, the display positions of which are controlled, from the control unit 7 and displays the additional information image and the expanded image.

The processing unit 9 is, for example, a hardware circuit of a wired logic. The processing unit 9 may be a functional module realized by a computer program executed by the image processing device 1. The processing unit 9 may hold the functions of the acquisition unit 3, the recognition unit 5, the calculation unit 6, and the control unit 7, as appropriate, and may implement each of the functions. Note that there may be cases where the processing unit 9 is not held by the image processing device 1.

Note that the image processing device 1 may be configured such that each function unit of the image processing device 1 is formed, for example, by an integrated circuit, such as an application specific integrated circuit (ASIC), a field programmable gate array (FPGA), and the like. Note that, if, after the additional information image is superimposed and thus displayed, the operation site of the user is not recognized in an arbitrary predetermined number of frames in an image acquired by the acquisition unit 3, the image processing device 1 may determine that the work state of the user has changed from an operation state to a confirmation state and may superimpose the additional information image on the position of the recognition target object and thus display an acquired image.

In the image processing device 1 in the first embodiment, unintentional focus changes of a user are reduced, and thus, eye strain is not caused and visibility of the recognition target object in the real world and the additional information image may be increased. Furthermore, in the image processing device 1 in the first embodiment, the image processing device 1 superimposes, in a "confirmation state", the additional information image on the same position as that of the recognition target object and thus displays an acquired image, and displays, in an "operation state", the additional information image in an area which is located adjacent to the recognition target object, in which the work position is easily compares, and also which does not interferes with the operation site of the user, and therefore, both of the visibility of the additional information image and the workability of the user may be increased.

Second Embodiment

In the first embodiment, the image processing device 1 performs image processing, assuming that the operation site of a user is a single site, whereas, in a second embodiment, image processing in which a plurality of operation sites are targets of processing will be described. In the second embodiment, for example, a case where, after an additional information image and an expanded image are displayed in a position in accordance with the moving direction of the finger of the right hand illustrated in FIG. 10 and FIG. 11C, a finger of the left hand is included in an image captured by the imaging unit 2 in accordance with a work performed by a user on the recognition target object is assumed.

The image processing device 1 calculates the moving direction of the finger of the left hand in a similar manner to that in the first embodiment and displays the additional information image and the expanded image in a direction that does not interfere with the moving direction of the finger of the right hand and the moving direction of the finger of the left hand. In FIG. 11C, the image processing device 1 displays the additional information image and the expanded image above the recognition target object. Furthermore, if the finger of the left hand or the finger of the right hand exists in a position that interferes with the additional information image, the image processing device 1 in the second embodiment further controls the display positions of the additional information image and the expanded image. Note that, in the second embodiment, a case where the finger of the left hand exists in a position that interferes with the additional information image will be described as an example.

The calculation unit 6 may calculate the position of the finger of the left hand, which is one of the operation sites of the user, in a similar manner using the method illustrated in the first embodiment, compare the position of the finger of the left hand to the display positions of the additional information image and the expanded image that are controlled by the control unit 7, and determine whether or not the position of the finger of the left hand interferes with the positions of the additional information image and the expanded image. If the finger of the left hand interferes with the additional information image and the expanded image, the control unit 7 retrieves an area in which the additional information image and the expanded image are not superimposed on the recognition target object, and in which the additional information image and the expanded image do not interfere with the finger of the left hand and the finger of the right hand.

Figure 12A:
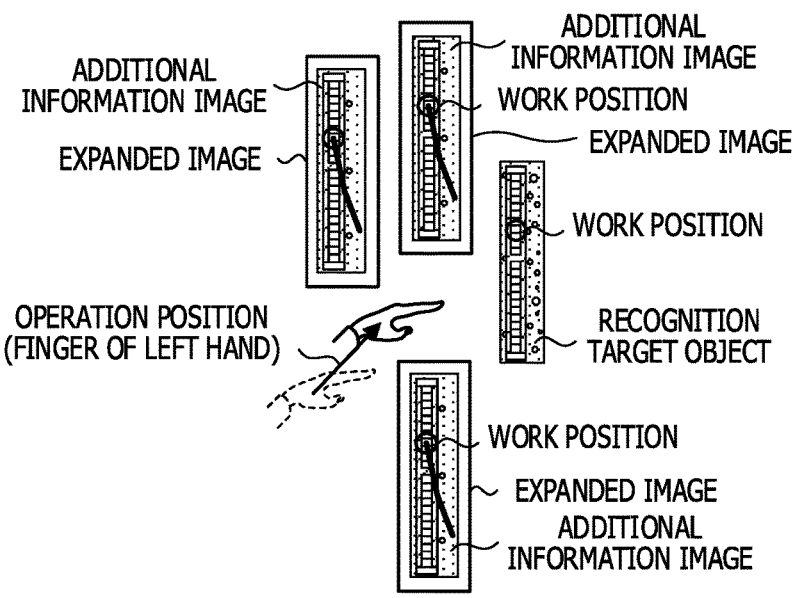
FIG. 12A is a first conceptual diagram of display area retrieval for an additional information image and an expanded image.

FIG. 12A is a first conceptual diagram of display area retrieval for an additional information image and an expanded image. In FIG. 12A, the control unit 7 retrieves a plurality of candidate first display positions for an additional information image and an expanded image, which are areas in which the additional information image and the expanded image are not superimposed on a recognition target object and in which the additional information image does not interfere with the finger of the left hand and the finger of the right hand. In FIG. 12A, three examples of the candidate first display positions are illustrated, but the number of the candidate first display positions is not particularly limited.

The control unit 7 performs narrowing processing using, as a candidate second display position, an area in which a change in angle of a work position of the additional information image in the candidate first display position is less than a predetermined threshold, assuming that the work position of the recognition target object is the origin. Next, the control unit 7 finally selects a candidate third display area in which a change in distance between work positions is the smallest among those for the plurality of candidate second display areas. The control unit 7 controls the finally selected candidate third display area as a display position for the additional information image.

Figure 12B:
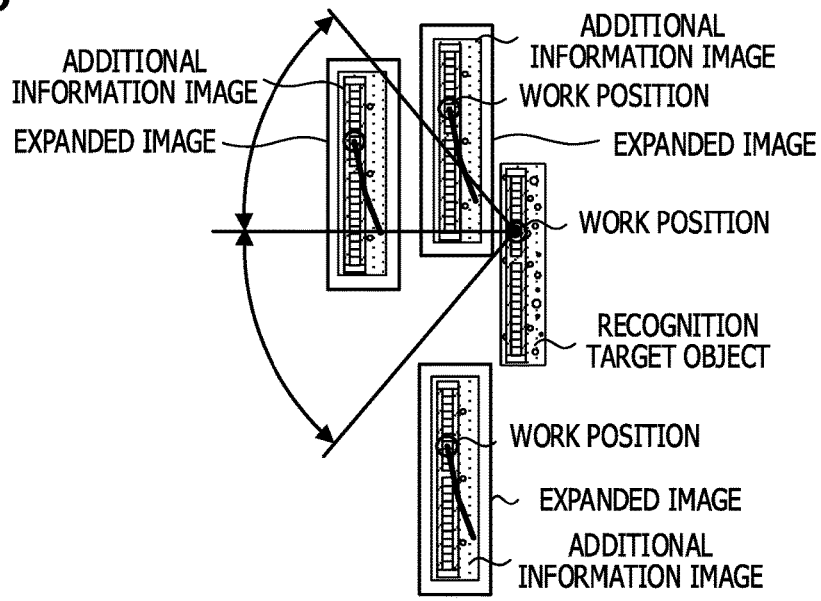
FIG. 12B is a second conceptual diagram of display area retrieval for an additional information image and an expanded image.
Figure 12C:
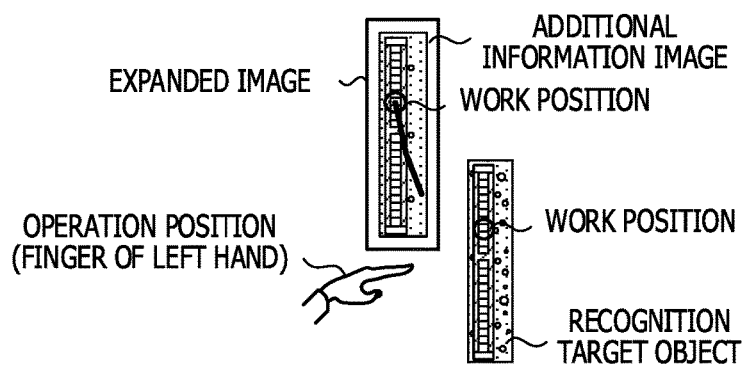
FIG. 12C is a third conceptual diagram of display area retrieval for an additional information image and an expanded image.

FIG. 12B is a second conceptual diagram of display area retrieval for an additional information image and an expanded image. FIG. 12C is a third conceptual diagram of display area retrieval for an additional information image and an expanded image. In FIG. 12B, the control unit 7 calculates an angle of a straight line connecting a work position of a recognition target object and a work position of an additional information image in a candidate second display area together. In FIG. 12B, for the two candidate first display areas located on the upper left of the recognition target object, the angle is smaller than a predetermined angle, and therefore, the control unit 7 sets the two candidate first display areas as the candidate second display areas, whereas, for the candidate first display area located on the lower left, a change in the angle is large, and therefore, the control unit 7 excludes the candidate first display area from the candidate second display areas. As illustrated in FIG. 12C, the control unit 7 finally selects the candidate third display area in which a change in distance between work positions is the smallest.

In the image processing device 1 disclosed in the second embodiment, even when a plurality of operation sites of a user are recognized on an image, the visibility of a recognition target object in the real world and an additional information image may be increased.

Third Embodiment

Figure 13:
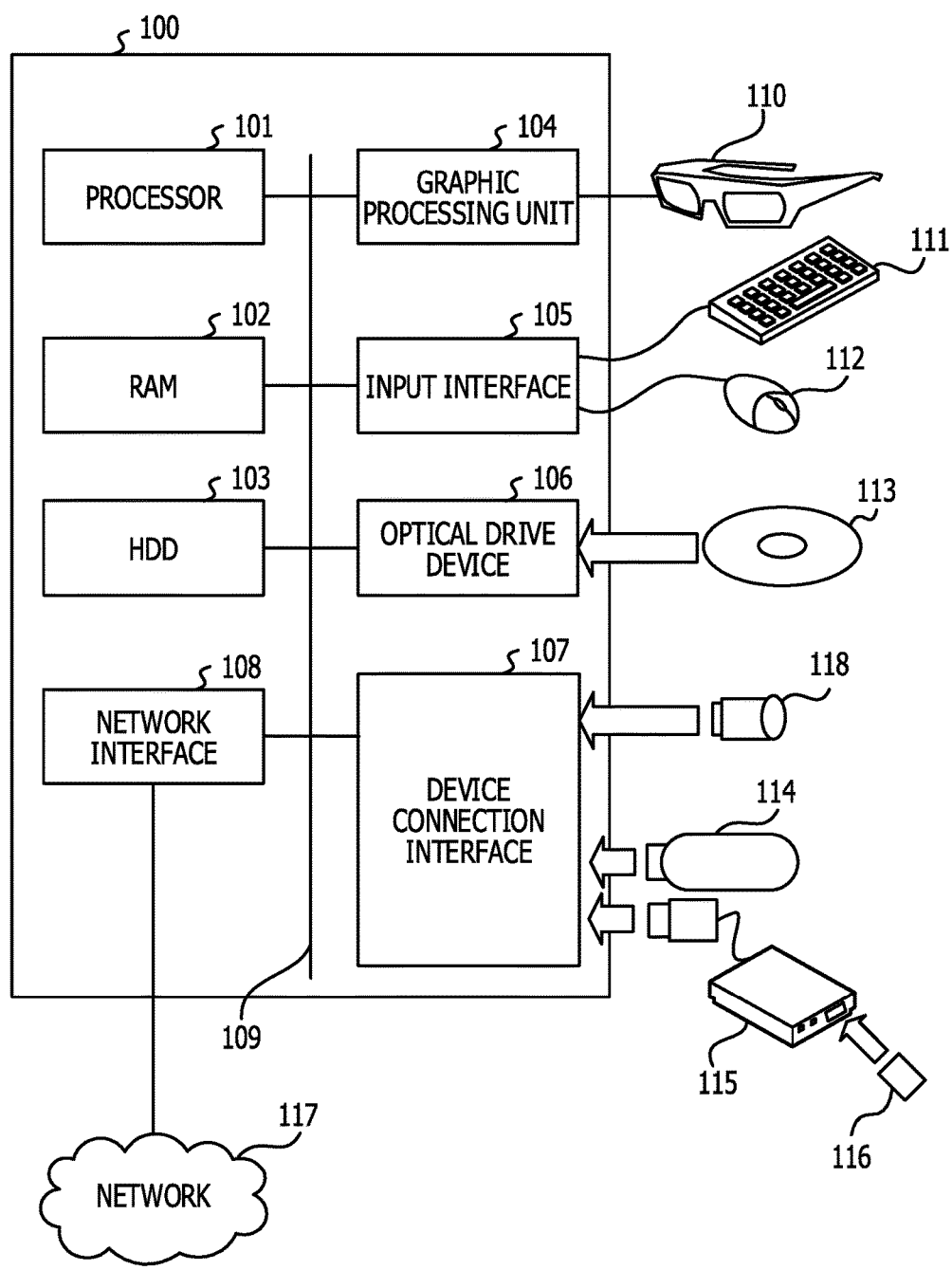
FIG. 13 is a hardware configuration diagram of a computer that functions as an image processing device according to an embodiment.

FIG. 13 is a hardware configuration diagram of a computer that functions as an image processing device 1 according to an embodiment. As illustrated in FIG. 13, the image processing device 1 includes a computer 100 and an input and output device (a peripheral device) coupled to the computer 100.

The computer 100 is entirely controlled by a processor 101. A random access memory (RAM) 102 and a plurality of peripheral devices are coupled to the processor 101 via a bus 109. Note that the processor 101 may be a multiprocessor. The processor 101 may also be, for example, a CPU, a micro processing unit (MPU), a digital signal processor (DSP), an application specific integrated circuit (ASIC), or a programmable logic device (PLD). Furthermore, the processor 101 may be a combination of two or more elements of CPU, MPU, DSP, ASIC, and PLD. Note that, for example, the processor 101 may execute the processing of the functional block of the acquisition unit 3, the recognition unit 5, the calculation unit 6, the control unit 7, the processing unit 9, and the like, illustrated in FIG. 1 or FIG. 3.

The RAM 102 is used as a main storage device of the computer 100. At least some of programs of an operation system (OS) and application programs that the processor 101 is caused to execute are temporarily stored in the RAM 102. Also, various types of data used for processing performed by the processor 101 are stored in the RAM 102. As the peripheral devices coupled to the bus 109, there are a hard disk drive (HDD) 103, a graphic processing unit 104, an input interface 105, an optical drive device 106, a device connection interface 107, and a network interface 108.

The HDD 103 performs magnetic writing and reading of data on a built-in disk. The HDD 103 is used as, for example, an auxiliary storage device of the computer 100. Programs of the OS, application programs, and various types of data are stored in the HDD 103. Note that, as the auxiliary storage device, a semiconductor memory device, such as a flash memory and the like, may be used. Note that the HDD 103 may execute the processing of the functional block of the storage unit 4, illustrated in FIG. 1 or FIG. 3.

A monitor 110 is coupled to the graphic processing unit 104. The graphic processing unit 104 causes the monitor 110 to display various types of images on a screen of the monitor 110 in accordance with an order sent from the processor 101. As the monitor 110, an optical see-through type display, such as a half mirror and the like, which has certain reflectivity and transitivity, and the like, may be used. Note that the monitor 110 may be held by a frame so as to be wearable by a user. Also, the monitor 110 may execute the processing of the functional block of the display unit 8, illustrated in FIG. 1 or FIG. 3.

A keyboard 111 and a mouse 112 are coupled to the input interface 105. The input interface 105 transmits signals sent from the keyboard 111 and the mouse 112 to the processor 101. Note that the mouse 112 is an example of a pointing device, and another pointing device may be used. As another pointing device, there are a touch panel, a tablet, a touch pad, a trackball, and the like.

The optical drive device 106 uses laser light or the like to perform reading of data recorded on an optical disk 113. The optical disk 113 is a portable recording medium in which data is recorded so as to be readable by reflection of light. Examples of the optical disk 113 include a digital versatile disc (DVD), a DVD-RAM, a compact disc read only memory (CD-ROM), a CD-recordable (R)/rewritable (RW), and the like. A program stored in the optical disk 113, which is a portable recording medium, is installed in the image processing device 1 via the optical drive device 106. A predetermined program that is installed may be executable by the image processing device 1.

The device connection interface 107 is a communication interface used for coupling a peripheral device to the computer 100. For example, a memory device 114 and a memory reader and writer 115 may be coupled to the device connection interface 107. The memory device 114 is a recording medium including a communication function that communicates with the device connection interface 107. The memory reader and writer 115 is a device that performs writing of data to a memory card 116 or reading of data from the memory card 116. The memory card 116 is a card type recording medium. Also, a camera 118 may be coupled to the device connection interface 107. Note that the camera 118 may execute the processing of the functional block of the imaging unit 2, illustrated in FIG. 1 or FIG. 3.

The network interface 108 is coupled to a network 117. The network interface 108 performs transmission and reception of data to and from another computer or a communication device via the network 117.

The computer 100 realizes the above-described image processing function, for example, by executing a program recorded in a computer-readable recording medium. A program in which processing contents that the computer 100 is caused to execute may be recorded in various recording mediums. The above-described program may be configured by one or more functional modules. For example, the program may be configured by a functional module in which the processing of the acquisition unit 3, the recognition unit 5, the calculation unit 6, the control unit 7, and the like, illustrated in FIG. 1 or FIG. 3 is realized. Note that a program that the computer 100 is caused to execute may be stored in the HDD 103. The processor 101 loads at least some of programs in the HDD 103 to the RAM 102 and executes the at least some of programs. Also, a program that the computer 100 is caused to execute may be recorded in a potable recording medium, such as the optical disk 113, the memory device 114, the memory card 116, and the like. The program stored in the portable recording medium is installed in the HDD 103 by, for example, control from the processor 101, and then, may be executed. Also, the processor 101 may directly read the program from the potable recording medium and thus execute the program.

Each component element of each unit illustrated in the drawings may not be physically configured as illustrated in the drawings. That is, specific embodiments of disintegration and integration of each unit are not limited to those illustrated in the drawings, and all or some of the units may be disintegrated/integrated functionally or physically in an arbitrary unit in accordance with various loads, use conditions, and the like. Various types of processing described in the above-described embodiment may be realized by causing a computer, such as a personal computer, a work station, and the like, to execute a program prepared in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
   a memory; and
   a processor configured to execute a plurality of instructions stored in the memory, the instructions comprising:
   recognizing a target object recognized from a first image, which is a captured image, including the target object in a real world;
   controlling a second image, which is an augmented image, including information of the target object from the first image, the second image being out of range of a focus distance of the first image;
   controlling a third image, which is an augmented image of the second image, to be formed so as to inscribe an outer surrounding of the second image and cover a center of visual field of a user relative to the second image, the third image being located on a boundary between the target object and the second image which is out of range of the focus distance of the first image; and
   displaying, in a state where the user directly visually recognizes the target object in the real world, the second image and the third image such that the second image and the third image are caused to correspond to a position of the target object in the real world,
   wherein, in the displaying, the second image which is out of range of the focus distance of the first image is displayed with the third image to be at the focus distance of the first image.

2. The device according to claim 1,
   wherein the controlling controls an outer edge of the third image based on a focal distance of the user relative to the second image and an angle relative to a vertical line of a fovea of the user which is defined based on the center of the visual field of the user.

3. The device according to claim 1,
   wherein the controlling controls the third image in such a manner that a brightness of the third image is greater than a brightness of the target object in the real world.

4. The device according to claim 1,
   wherein the controlling defines
   the outer edge of the second image based on a length of an outer edge of the target object in the first image, and
   an outer edge of the third image by extending the length based on the focal distance and an tangent of the angle in a direction in which the third image includes the second image from the outer edge of the second image.

5. The device according to claim 1,
   wherein the recognizing
   accesses to a storage storing a first feature that corresponds to the target object, and
   recognizes the target object included in the first image by extracting a second feature from the first image and associating the first feature and the second feature to each other.

6. The device according to claim 1,
   wherein the first image further includes an operation site of the user,
   wherein the recognizing recognizes the operation site from the first image,
   wherein the instructions further comprising:
   calculating a motion vector of the operation site from multiple ones of the first image, and
   wherein the controlling controls display positions of the second image and the third image based on the position of the target object and the motion vector.

7. The device according to claim 6,
   wherein, the controlling controls the display position of the second image so as to be superimposed on the target object, when the motion vector is less than a first threshold.

8. The device according to claim 7,
   wherein the controlling controls, when the motion vector is more than the first threshold, the display positions of the second image and the third image to move within a predetermined direction from the motion vector, a distance between a reference position of the target object and a reference position of the second image is at a smallest distance.

9. The device according to claim 7,
   wherein the controlling stops displaying of the second image and the third image, when the motion vector is equal to the first threshold or more.

10. An image processing method comprising:
    recognizing a target object recognized from a first image, which is a captured image, including the target object in a real world;
    controlling, by a computer processor, a second image, which is an augmented image, including information of the target object from the first image, the second image being out of range of a focus distance of the first image;
    controlling a third image, which is an augmented image of the second image, to be formed so as to inscribe an outer surrounding of the second image and cover a center of visual field of a user relative to the second image, the third image being located on a boundary between the target object and the second image which is out of range of the focus distance of the first image; and
    displaying, in a state where the user directly visually recognizes the target object in the real world, the second image and the third image such that the second image and the third image are caused to correspond to a position of the target object in the real world,
    wherein, in the displaying, the second image which is out of range of the focus distance of the first image is displayed with the third image to be at the focus distance of the first image.

11. The method according to claim 10,
    wherein the controlling controls an outer edge of the third image based on a focal distance of the user relative to the second image and an angle relative to a vertical line of a fovea of the user which is defined based on the center of the visual field of the user.

12. The method according to claim 10,
    wherein the controlling controls the third image in such a manner that a brightness of the third image is greater than a brightness of the target object in the real world and/or the third image other than with a texture feature amount.

13. The method according to claim 10,
wherein the controlling defines
the outer edge of the second image based on a length of an outer edge of the target object in the first image, and
an outer edge of the third image by extending the length based on the focal distance and an tangent of the angle in a direction in which the third image includes the second image from the outer edge of the second image.

14. The method according to claim 10,
wherein the recognizing
accesses to a storage storing a first feature that corresponds to the target object, and
recognizes the target object included in the first image by extracting a second feature from the first image and associating the first feature and the second feature to each other.

15. The method according to claim 10,
wherein the first image further includes an operation site of the user,
wherein the recognizing recognizes the operation site from the first image,
wherein the instructions further comprising:
calculating a motion vector of the operation site from multiple ones of the first image, and
wherein the controlling controls display positions of the second image and the third image based on the position of the target object and the motion vector.

16. The method according to claim 15,
wherein, the controlling controls the display position of the second image so as to be superimposed on the target object, when the motion vector is less than a first threshold.

17. The method according to claim 15,
wherein the controlling controls, when the motion vector is more than the first threshold, the display positions of the second image and the third image in such a manner that a position in which the target object is located in the motion vector, the second image, and the third image, and a position in which a distance between a reference position of the target object and a reference position of the second image is at a smallest distance.

18. The method according to claim 15,
wherein the controlling stops displaying of the second image and the third image, when the motion vector is equal to the first threshold or more.

19. A non-transitory computer-readable medium that store an image processing program for causing a computer to execute a process comprising:
recognizing a target object recognized from a first image, which is a captured image, including the target object in a real world;
controlling a second image, which is an augmented image, including information of the target object from the first image, the second image being out of range of a focus distance of the first image;
controlling a third image, which is an augmented image of the second image, to be formed so as to inscribe an outer surrounding of the second image and cover a center of visual field of a user relative to the second image, the third image being located on a boundary between the target object and the second image which is out of range of the focus distance of the first image; and
displaying, in a state where the user directly visually recognizes the target object in the real world, the second image and the third image such that the second image and the third image are caused to correspond to a position of the target object in the real world,
wherein, in the displaying, the second image which is out of range of the focus distance of the first image is displayed with the third image to be at the focus distance of the first image.

* * * * *